(12) United States Patent
Neumann et al.

(10) Patent No.: US 10,675,575 B2
(45) Date of Patent: Jun. 9, 2020

(54) METHOD FOR PRODUCING A FILTER MEDIUM, AND A FILTER MEDIUM

(71) Applicant: MANN+HUMMEL GmbH, Ludwigsburg (DE)

(72) Inventors: Jens Neumann, Stuttgart (DE); Anton Kreiner, Reisbach (DE); Markus Weindl, Steinberg (DE); Christian Zisslsberger, Grafling (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 175 days.

(21) Appl. No.: 15/898,718

(22) Filed: Feb. 19, 2018

(65) Prior Publication Data
US 2018/0178150 A1 Jun. 28, 2018

Related U.S. Application Data

(63) Continuation of application No. PCT/EP2016/063742, filed on Jun. 15, 2016.

(30) Foreign Application Priority Data
Aug. 19, 2015 (DE) .................. 10 2015 010 843

(51) Int. Cl.
*B01D 39/16* (2006.01)
*B01D 39/18* (2006.01)
(Continued)

(52) U.S. Cl.
CPC ............ *B01D 39/18* (2013.01); *B01D 39/163* (2013.01); *B01D 39/1623* (2013.01);
(Continued)

(58) Field of Classification Search
CPC ............ B01D 39/1615; B01D 39/1623; B01D 39/163; B01D 39/18; B01D 2239/025; B01D 2239/0618; B01D 2239/0622; B01D 2239/0627; B01D 2239/0631; B01D 2239/0654; B01D 2239/0672; B01D 2239/0681; B01D 2239/08; B01D 2239/10; B01D 2239/1233; B01D 2275/10; B29C 65/4895; B32B 5/022; B32B 5/26;
(Continued)

(56) References Cited

U.S. PATENT DOCUMENTS 3,592,767 A * 7/1971 Pall ..................... B01D 29/111
210/490
3,717,524 A * 2/1973 Culp ..................... D05C 17/02
156/72

(Continued)

*Primary Examiner* — Michael A Tolin
(74) *Attorney, Agent, or Firm* — James Hasselbeck

(57) ABSTRACT

In a method for producing a filter medium, at least one substrate layer of a nonwoven comprising cellulose fibers and/or synthetic polymer fibers is provided and a fiber layer of polymer fibers is deposited on the at least one substrate layer. Prior to depositing the fiber layer, a solvent is applied to the at least one substrate layer, wherein a material of the substrate layer and/or a material of the fiber layer is soluble in the solvent. A filter medium produced by the method has material-fused connections at crossing points of the polymer fibers and/or cellulose fibers of the substrate layer with the polymer fibers of the fiber layer.

12 Claims, 6 Drawing Sheets

(51) Int. Cl.
*B29C 65/48* (2006.01)
*B32B 5/26* (2006.01)
*B32B 7/12* (2006.01)
*D04H 1/552* (2012.01)
*D04H 1/559* (2012.01)
*D04H 1/728* (2012.01)
*D04H 3/12* (2006.01)
*D01D 5/00* (2006.01)

(52) U.S. Cl.
CPC ............ *B29C 65/4895* (2013.01); *B32B 5/26* (2013.01); *B32B 7/12* (2013.01); *D01D 5/003* (2013.01); *D04H 1/552* (2013.01); *D04H 1/559* (2013.01); *D04H 1/728* (2013.01); *D04H 3/12* (2013.01); *B01D 2239/025* (2013.01); *B01D 2239/0478* (2013.01); *B01D 2239/0618* (2013.01); *B01D 2239/0631* (2013.01); *B01D 2239/0654* (2013.01); *B01D 2239/0672* (2013.01); *B01D 2239/0681* (2013.01); *B01D 2239/10* (2013.01); *B01D 2239/1233* (2013.01); *B01D 2275/10* (2013.01)

(58) Field of Classification Search
CPC ........ B32B 7/12; D01D 5/003; D01D 5/0038; D01D 5/0084; D04H 1/552; D04H 1/559; D04H 1/728; D04H 3/033; D04H 3/12
See application file for complete search history.

(56) References Cited

U.S. PATENT DOCUMENTS

| | | | |
|---|---|---|---|
| 7,618,702 B2 * | 11/2009 | Frey | B01D 39/1623 428/297.4 |
| 8,092,566 B2 * | 1/2012 | Lim | B01D 39/1615 55/486 |
| 2005/0235619 A1 | 10/2005 | Heinz et al. | |
| 2006/0137317 A1 | 6/2006 | Bryner et al. | |
| 2007/0075015 A1 | 4/2007 | Bates, III et al. | |
| 2007/0163217 A1 | 7/2007 | Frey et al. | |
| 2009/0199717 A1 | 8/2009 | Green et al. | |
| 2010/0107578 A1 | 5/2010 | Behrendt et al. | |

* cited by examiner

METHOD FOR PRODUCING A FILTER MEDIUM, AND A FILTER MEDIUM

CROSS-REFERENCE TO RELATED APPLICATIONS

This application is a continuation application of international application No. PCT/EP2016/063742 having an international filing date of 15 Jun. 2016 and designating the United States, the international application claiming a priority date of 19 Aug. 2015, based on prior filed German patent application No. 10 2015 010 843.3, the entire contents of the aforesaid international application and the aforesaid German patent application being incorporated herein by reference.

TECHNICAL FIELD

The invention concerns a method for producing a filter medium, and a filter medium.

BACKGROUND OF THE INVENTION

WO 2009/067365 A3 discloses a method in which nanofibers, by means of electrospinning, are deposited wet or moist onto a substrate layer. In this context, the nanofibers fuse with each other at the crossing points. The exact process control is however very complex and is difficult to realize.

Moreover, an electroblowing method is known in which nanofibers are blown under pressure. Compared to the generally known electrospinning methods, only fiber layers with high variance in regard to the fiber diameters of the individual fibers can however be realized by means of the electroblowing method. Thus, two principally different production processes are concerned.

Moreover, EP 1 940 531 B1 discloses to solidify nanofibers of low melting point by means of thermal calendering and to bond them with a substrate layer. However, in this context, the nanofibers fuse with each other and with the fibers of the substrate layer practically at all crossing points.

The most commonly used variant for bonding a nanofiber layer with a substrate layer is realized by use of a bonding agent. Depending on the application method of the bonding agent, often the formation of sail-like projections, forming an undesirable air resistance, between individual fibers on the filter surface is to be expected in this context. Due to different surface properties, generally a matching bonding agent system must be developed for different substrate layers. Moreover, the employed bonding agent must be resistant relative to the medium to be purified; otherwise, it can dissolve, for example, in case of liquid filtration, and the nanofiber layer can become damaged as a result.

SUMMARY OF THE INVENTION

Based on this prior art, it is now object of the present invention to provide a method which provides an improved bonding between a first fiber layer and a second fiber layer. This concerns in particular, but not exclusively, deposition of a nanofiber layer on a substrate layer. In addition, a corresponding filter medium is to be provided.

The invention solves the present object by a method for producing a filter medium that comprises the following method steps:
I. providing at least one substrate layer of a nonwoven of cellulose fibers and/or synthetic polymer fibers;
II. depositing a fiber layer of polymer fibers, preferably synthetic polymer fibers, on the substrate layer,
wherein, prior to deposition of the fiber layer, a solvent in which the material of the substrate layer and/or the material of the fiber layer is soluble is applied to the substrate layer. The substrate layer is also embodied as a fiber layer.

By means of the method according to the invention, a filter medium with high air permeability and high filter action can be realized.

The invention solves the object by a filter medium, in particular produced according to the method of the invention, that comprises a substrate layer of polymer fiber and/or cellulose fiber nonwoven and a fiber layer of polymer fibers arranged thereon, wherein the filter medium comprises material-fused connections at crossing points of the fibers of the substrate layer with the fibers of the further fiber layer.

Advantageous embodiments of the invention are subject matter of the dependent claims.

The deposited fiber layer can advantageously be embodied as a nanofiber layer, wherein at least 90% of the fibers of this layer are nanofibers. It is especially advantageous when at least 90% of the fibers of the further fiber layer have an average fiber diameter of less than 500 nm, in particular less than 200 nm. In a further advantageous preferred embodiment variant, the average fiber diameter of the aforementioned fibers amounts to at least 50 nm.

The solvent can advantageously be a diluted or concentrated acid or a diluted or concentrated base. In particular, the solvent can be advantageously an organic acid or organic base. Particularly preferred, diluted formic acid can be used.

It has been found to be particularly advantageous when the solvent contains a polymer prior to its application on the substrate layer. This polymer can be present in particular dissolved in the solvent.

In a particularly preferred embodiment variant, the plastic compound can be the same plastic component of which also the deposited fiber layer and/or the substrate layer is primarily comprised.

The deposition of the fiber layer can advantageously be realized by an electrospinning method. This is advantageous because in electrospinning the average fiber diameter of individual fibers within the fiber layer varies only minimally.

After the deposition of the fiber layer, drying of the filter medium can be performed. In this way, the dissolution of the individual fibers in sections and bonding of individual fiber layers of the filter medium can be varied.

The filter medium according to the invention comprises a substrate layer of polymer fiber and/or cellulose fiber nonwoven and a fiber layer of polymer fibers arranged on top. Preferably, these polymer fibers of the nonwovens are fibers of synthetic polymers. The filter medium comprises material-fused connections at crossing points of the fibers of the substrate layer with the fibers of the fiber layer.

These material-fused connections are preferably arranged such that a flat fused area of partially dissolved and/or dissolved fibers is formed within the crossing area. Partially dissolved means in this context that the fiber contours of both fibers connected with each other can still be detected. Dissolved means that at least the fiber contour of one of the two fibers is no longer recognizable in regard to its thread-shape contour. In a particularly preferred embodiment, the partially dissolved fibers are deposited nanofibers of the deposited fiber layer.

Furthermore, the filter medium preferably comprises no flat fused area at crossing points which are formed only by fibers of the fiber layer. Even though, due to the residual moisture, a partial adhesion of the fibers can occur, the fiber contour of the respective fibers is however substantially maintained in this context. A flat fused area is not formed in this context, but a connection between two fibers which extends across an area of preferably less than 50%, in particular less than 40%, relative to the fiber circumference.

The filter medium according to the invention can be produced particularly preferred according to a method of the invention.

The fused area can advantageously be formed in sections thereof as a closed flat structure and embodied such that, in the area of this closed flat structure, no fiber contour at least of the fibers of the deposited fiber layer can be recognized in sections thereof. This means that in one or a plurality of areas of the flat structure a fiber contour is still recognizable and in one or a plurality of areas no fiber contour of the fibers of the deposited fiber layer can be recognized. The fiber contour of the substrate layer may still be recognizable however. This does not apply to the fused areas of all crossing points but only to a few crossing points.

Particularly preferred, at least 10%, in particular at least 20%, of the fused areas are however embodied in such a way that the fiber contour of individual fibers, in particular of the nanofibers, is no longer recognized over sections thereof.

Moreover, the fused areas can also be embodied as only partially closed flat structures. The flat structure corresponds preferably to at least the square of three times the average fiber diameter of the fiber layer with the smaller average fiber diameter, $A=(3d)^2$. The smaller average fiber diameter relates to the fibers of one of the two fiber layers connected to each other.

BRIEF DESCRIPTION OF THE DRAWINGS

In the following, the invention will be explained with the aid of an exemplary embodiment with reference to the attached figures in more detail.

FIG. 2b is a monochromatic illustration of FIG. 2a.

FIG. 3a is an enlarged image of FIG. 2a.

FIG. 3b is a monochromatic image of FIG. 3a.

FIG. 4a is an enlarged image of FIG. 3a.

FIG. 4b is a monochromatic image of FIG. 4a.

FIG. 5b is a monochromatic image of FIG. 5a.

DESCRIPTION OF PREFERRED EMBODIMENTS

The Figures show only examples and are not to be understood as limiting.

Figure 2A:
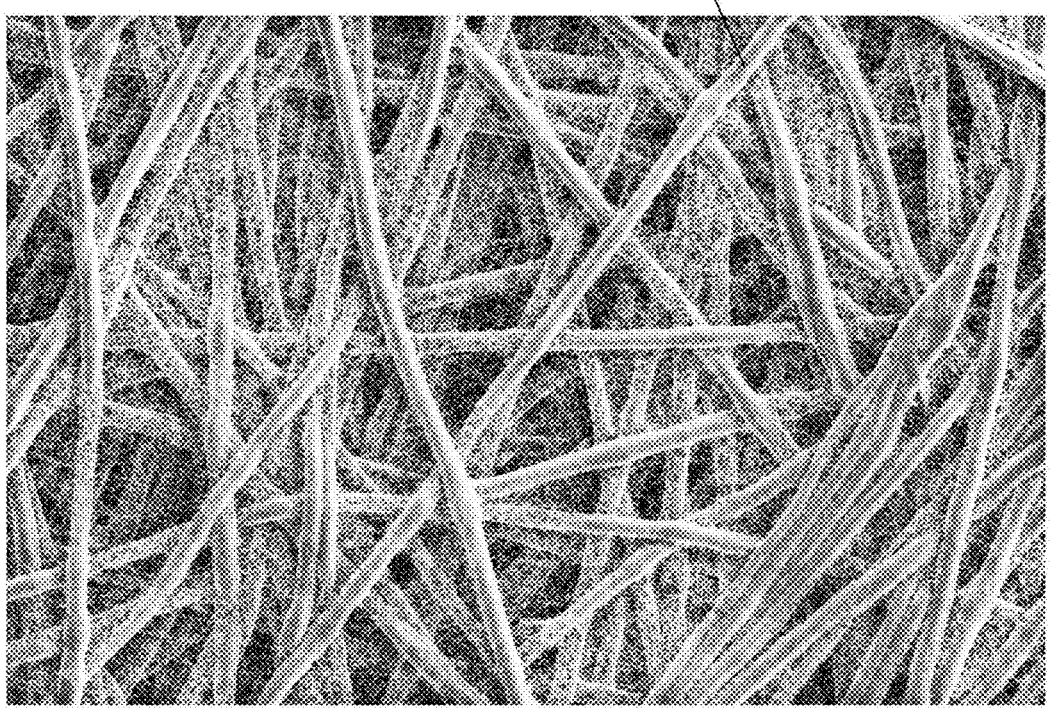
FIG. 2a is a microscope image of a filter medium according to the invention.
Figure 2B:
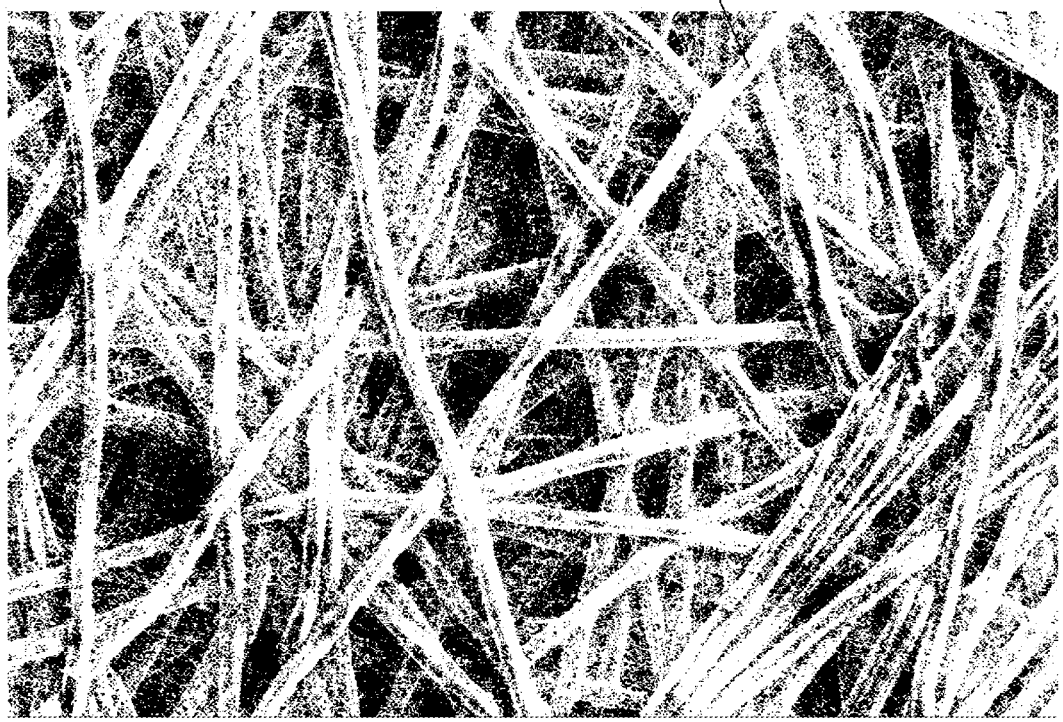

FIGS. 2a, 2b; 3a, 3b; 4a, 4b; 5a, 5b show an embodiment of a filter medium according to the invention with a substrate layer in the form of a nonwoven layer with polymer fibers and/or cellulose fibers 1. A fiber layer of nanofibers 2 is deposited on this substrate layer.

Figure 1:
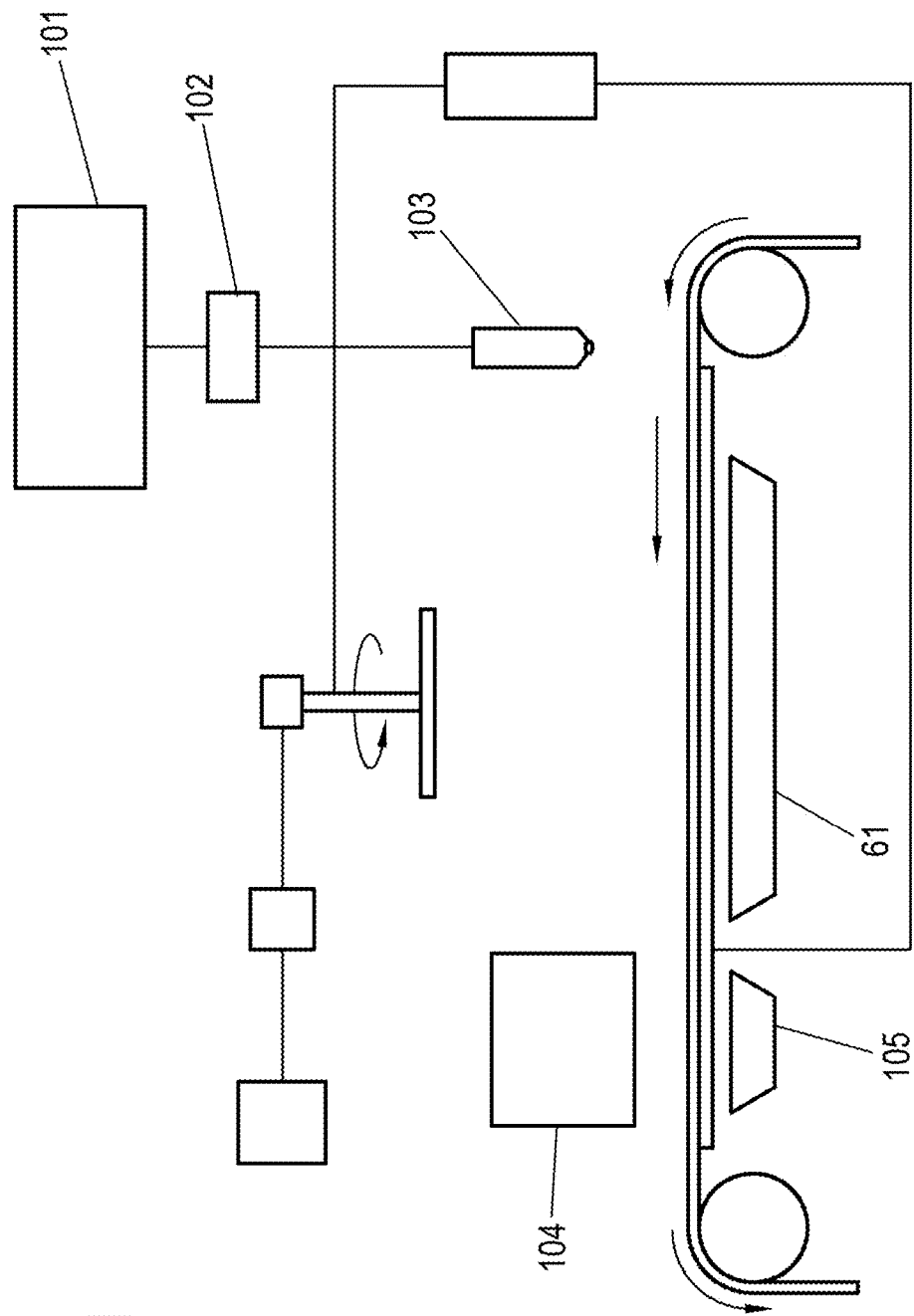
FIG. 1 shows a device for performing a method according to the invention.

The fiber layer of nanofibers can be deposited on the substrate layer by an electrostatic spinning method or by an electrospinning method, by means of a device as it is illustrated in an exemplary fashion in FIG. 1. This constitutes only one possibility of illustrating an electrospinning device. It is, of course, also possible to utilize other electrospinning devices for producing the filter medium according to the invention.

The first variant of an electrospinning device illustrated in FIG. 1 comprises a container 80 in which a polymer solution for fiber formation is contained. This polymer solution is guided through a pump 81 in the direction toward a rotating spinning electrode 40.

The spinning electrode comprises a rotary drive 41, a hollow shaft 43, and a spinning electrode head 42. This spinning electrode head 42 comprises a plurality of displaced holes 44, the spinning nozzles.

The rotary drive 41 comprises a rotary passage so that the polymer solution can be transferred from a fluid conduit extending away from the pump 81 into the hollow shaft 43 which guides the polymer into the spinning electrode head 42 and at the same time transmits the rotational movement of the rotation drive 41 to the spinning electrode head 42. The holes 44 are arranged at different radial distances from the rotation center of the electrode spinning head 42.

The electrode spinning head 42 rotates in an electrostatic field. This causes a droplet of the polymer solution which exits from the spinning nozzles to be accelerated by the electrostatic field in the direction of a deposition locations 70.

Spaced apart from the spinning electrode 40, the electrospinning device comprises a substantially flat grid 60. The deposition location 70 is provided on this grid 60. One or several substrate layers, in particular in the form of fiber nonwoven layers, are located at the deposition location 70.

Below the grid, a first vacuum collecting device 61 can be arranged. In this way, air can be sucked through the grid and the fibers 1 of the substrate can be fixed on the grid and the deposited fibers 2 on the substrate.

The deposition location 70, for example, where a substrate layer is located, is guided about the rollers 71 and 72 which are arranged neighboring opposite ends of the grid 60. An electrostatic high-voltage potential is generated between the spinning electrode 40 and the grid 60 by means of a suitable electrostatic voltage source 61 and by two connectors 62 and 63 and maintained during the production process. The grid 60 is also referred to as a collecting electrode.

The spinning electrode 40 transfers a charge onto the polymer solution so that the polymer is formed in the form of fine fibers in the direction toward the grid 60. They are collected on the substrate. Usually, the solvent which is adhering to the fibers, is evaporated during the flight and prior to deposition of the fibers. The electrostatic field strength is selected such that nanofibers, i.e., very thin fibers, are formed during acceleration from the spinning electrode 40 toward the deposition location 70.

By increasing or slowing the feeding speed of the deposition location, i.e., the substrate layer, more or fewer fibers 2 can be deposited on the fibers 1 of the substrate, whereby the control of the thickness of the deposited fiber layer can be realized.

In an alternative and preferred second variant of a known electrospinning apparatus, a polymer solution or polymer melt can be sprayed from a thin steel wire. The wires are either arranged on a cylinder and dip by a circular movement regularly into the spinning solution, whereby they are covered with solution or melt, or they are stationary, arranged one behind the other, and are furnished by a coating device continuously with the spinning solution from a storage container. Since high voltage is applied between the wires and a counter electrode on the opposite side of the material to be coated, this causes spraying of the solution from the wires. The applied voltage effects a conical deformation of the drop in the direction of the counter electrode. On the path to the counter electrode, the solvent which is contained in the spinning solution evaporates (or the melt solidifies) and on the side of the counter electrode solid fibers are deposited at high speed, having diameters of several μm down to a few nm.

FIG. 2 shows an electrospinning device according to the invention for producing a filter medium. In contrast to FIG. 1, the electrospinning device comprises a solvent storage tank 101, a metering device 102 for a targeted and controlled dispensing of the solvent onto the substrate upstream of the deposition location 70 as well as an application device 103 which is in the form of a nozzle in FIG. 2.

However, a dispensing device 103 that is differently embodied can be provided also, for example, a nozzle beam.

In addition, the device may comprise a drying device 104 which is arranged downstream of the deposition location 70. Alternatively or additionally, downstream of the deposition location in the feeding direction of the deposition location 70, a second vacuum collecting device 105 can be arranged also. Both elements can be utilized for drying the filter medium.

Of course, the aforementioned second variant of an electrospinning device or apparatus can also be modified relative to FIG. 1 with the corresponding changes of FIG. 2.

With the aid of FIG. 2, in the following the method according to the invention for producing a filter medium, comprising at least a substrate layer of fiber material and at least a fiber layer of polymer fibers deposited thereon, in particular a nanofiber layer, will be described in more detail.

In a first method step I, providing a substrate layer in the form of a fiber layer is realized. Some preferred embodiment variants of the substrate layer will be explained in the following.

The substrate layer can be provided as a support layer. The substrate layer can be, for example, embodied as a meltblown fiber nonwoven layer or as a spunbonded fiber nonwoven layer. The fibers of the substrate layer can be preferably polyester and/or polypropylene fibers. Fibers based on cellulose can also be preferably employed for the substrate layer. The terms meltblown, spunbonded and further terms of the field of nonwoven production are, for example, defined in "Vliesstoffe: Rohstoffe, Herstellung. Anwendung, Eigenschaften, Prüfung" (title translation: "*Nonwovens: raw materials, production, application, properties, testing*"), 2nd edition, 2012, Weinheim; ISBN: 978-03-527-31519-2.

The average weight per surface area of the substrate layer can amount preferably to more than 60 g/m². The determination of the average weight per surface area is realized according to DIN/EN ISO 536 for paper layers and according to DIN/EN 29073-1 for nonwovens. The average weight per surface area of the support layer can advantageously be at least 60 times greater than the average weight per surface area of the fiber layer arranged thereon. The average fiber diameter of the fibers of the substrate layer can amount in particular to more than 3 μm.

Providing in accordance with method step I is realized preferably by linear movement of the substrate layer along individual components of the electrospinning device. This is done preferably with continuous feeding speed.

In a second method step II, an application of a solvent onto the substrate layer is performed. Preferably, a surficial wetting of the fibers of the substrate layer by droplets is performed, which are dispensed onto the substrate layer, for example, by the application device 103 schematically illustrated in FIG. 1. Alternatively, but also preferred, a roller coating can be provided by which the application of the solvent onto the substrate layer is realized by a roller. In particular in the roller coating process, the solvent spreads in an advantageous manner and forms thus a thin liquid film on the surface of the substrate layer.

The solvent droplets and/or the liquid film enables partial dissolving of the fibers of the substrate layer. Preferably, the fiber material of the substrate layer as well as of the fiber layer of polymer fibers arranged on top is soluble in the applied solvent.

Particularly preferred, the solvent is a base or an acid, in particular an organic base or an organic acid.

In this context, the respective acid or base can also be present in diluted form. Particularly preferred, concentrated or diluted formic acid can be used as solvent. In a particularly preferred embodiment variant, diluted formic acid is employed wherein water is used as a dilution agent and the dilution relative to concentrated formic acid mounts to 10-70% by volume, in particular however advantageously 40-55% by volume.

Ideally, the afore described supplied formic acid/water mixture can contain a polymer. The latter can be present undissolved in particles, but preferably dissolved, in the solvent mixture. In a preferred embodiment variant, the polymer can be the same polymer of which a large proportion, i.e., at least 50%, of the deposited fibers and/or the fibers of the substrate layer are formed. This can be, for example, polyamide of which the fibers of at least one of the two layers are formed and which in addition is contained in the added solvent.

It has been found to be beneficial when the temperature of the applied solvent is less than 50° C., preferably less than 40° C.

Preferably, the evaporation temperature of the applied solvent is less than 150° C., particularly preferred less than 110° C.

Already by application of the solvent on the substrate layer, advantageously a compaction of the fibers of the substrate layer and thus a solidification of the substrate layer can be realized.

Having the substrate layer soaked through has been found to be unfavorable however. In a preferred embodiment variant, the volume of the applied solvent can therefore amount to less than 10 g/m², particularly preferred less than 6 g/m².

The application of the solvent, as illustrated in FIG. 1, can be preferably done by a spraying method. However, also other application variants are possible, for example, coating by doctor blade, cylinder or roller.

In a third method step, the deposition of fibers on the substrate layer, which has been moistened or wetted with solvent, is carried out.

This deposited fiber layer of polymer fibers can be a fiber layer with an average fiber diameter of several micrometers. In a particularly preferred embodiment of the invention, the deposited fibers are however nanofibers and the deposited fiber layer is a nanofiber layer.

The term "nanofibers" comprises fibers with an average fiber diameter in a range between one nanometer and 1,000 nanometers.

In this context, the average fiber diameter can be determined based on an image section from above. In this context, the fiber diameters of all fibers contained within the image section can be determined and an average value of these fiber diameters can be determined. Particularly preferred, the average fiber diameter is determined by the method according to DE 10 2009 043 273 A1, reference being had to this patent application and incorporated in its entirety in the context of the present invention.

The nanofibers of the deposited fiber layer can be comprised preferably of more than 75% of polyamide nanofibers, in particular 100% of polyamide. Nanofibers of polyamide can be produced in a time-efficient and cost-effective way. Further preferred nanofiber materials which according to the present invention can be spun to nanofibers are polyaramides, polyolefins, polyacetals, polyesters, cellulose esters, cellulose ethers, polyalkylene sulfides, polyarylene oxides, polysulfones, modified polysulfones and/or mixtures of these polymers. Particularly preferred materials of the aforementioned polymer classes which are suitable for the aforementioned nanofibers are in particular polyethylene, polypropylene, polyvinyl chloride, polymethylmethacrylate (and other acrylic resins), polystyrene and/or copolymers of the aforementioned polymers, comprising block copolymers of the type ABBA as well as polyvinylidene fluoride, polyvinylidene chloride, polyvinyl alcohol in different degrees of hydrolysis (87% to 99.5%) in cross-linked or uncross-linked form.

In a preferred embodiment variant, the deposited fibers are nanofibers to more than 90%. Particularly preferred, more than 95% of the deposited fibers of which the deposited fiber layer is formed are nanofibers.

The aforementioned nanofibers in a preferred embodiment variant can comprise an average fiber diameter of less than 500 nm, preferably less than 200 nm. In a preferred embodiment variant, at least 50% of the deposited nanofibers comprise an average fiber diameter of less than 100 nm.

The deposited fiber layer, in particular the deposited nanofibers, is produced particularly preferred by an electrospinning method, as illustrated in an exemplary fashion in FIG. 1. Other application methods are also possible, but less preferred.

By means of the electrospinning method, mostly fiber layers with finer layer thicknesses can be produced. They exhibit relative to other production methods, for example, the electroblowing method, a more homogenous fiber diameter distribution. For example, the fiber diameter of an individual nanofiber of a nanofiber layer produced by electrospinning with an average fiber diameter of 150 nm deviates only by maximally 50 nm from this average value.

For manufacturers of devices for producing finest fibers by means of electrospinning methods, the uniformness of the produced fibers is an important quality criterion. The customer should be enabled to reproducibly produce fibers with a diameter that is as exactly defined as possible with minimal variance. For example, it is thus possible to produce nanofibers with the aforementioned average fiber diameters in a defined manner and to arrange them in layers on top of each other.

In a further preferred embodiment variant, the nanofiber layer is deposited on the substrate layer like a spider web, i.e., with very minimal and therefore difficult-to-quantify layer thickness. In this context, the average weight per surface area of the deposited nanofiber layer amounts to preferably less than 1 g/m$^2$.

It is also possible to deposit a plurality of fiber layers, in particular a plurality of nanofiber layers, on top of each other, for example, by several application devices that are arranged sequentially one behind the other. Also, fiber gradients with regard to fiber density and fiber diameter can be realized within the deposited fiber layer in inflow direction.

When depositing the fibers, partial dissolving of the applied fibers occurs in the wetted areas or in the area of the droplets of the solvents which are present on the substrate.

In the partially dissolved state in the wetted areas, the deposited fibers in the partially dissolved state fuse materially with the fibers of the substrate layer. These partially dissolved connecting areas in the context of the present invention are defined as fused area wherein these areas however do not result from melting by thermal treatment. They can also be partially dissolved in part. The latter is however only the case in a particularly preferred embodiment variant.

By the only partial material-fused connection, the filtering action of the deposited fiber layers is not impaired or only impaired very minimally.

In an optional additional method step, drying can be performed. This can be done, for example, by a vacuum collecting device by sucking away the solvent and/or by blowing in hot air at temperatures of preferably more than 80°. Drying of the filter medium with the two aforementioned layers, i.e., the substrate layer and the layer deposited thereon is to be selected ideally such that the solvent is removed without residue.

The term "filter medium" concerns a structure for filtration of a fluid. In this context, a retentate is formed on or in the filter medium and a filtrate, the purified fluid. Particularly preferred, particles are filtered out as a retentate from the fluid by the filter medium and thus removed from the fluid. Depending on the configuration of the filter medium, particles and other substances can be completely or only partially removed from the fluid to be filtered.

The filter medium can be provided as part of a filter element. The filter element, for example, can be an exchangeable part in a machine or in a device. Such an exchangeable part can be, for example, a filter cartridge. When a filter medium becomes clogged with retentate, the filter cartridge can be replaced without the entire machine being impacted by such an exchange.

The filter medium produced according to the invention can be used for filtering gases as well as liquids. In particular, the filter medium can be employed for so-called intake air filters of engines, liquid filters and/or interior filters. The filter element can be used, for example, also as an erosion filter in an erosion machine and for removal of particles from a liquid, in particular from water or from an aqueous solution.

While especially nanofiber layers usually are deposited loosely onto a substrate layer or by means of a bonding agent are fixed on a substrate layer, with the present production process it is possible to arrange a nanofiber fixedly, but without impairment of the air permeability, on a substrate layer.

It is possible to save on material costs by eliminating the usual bonding agent. In addition, the connection of the deposited fiber layer and the substrate layer is not water soluble, as is frequently the case for bonding agents. A resistance testing for use in liquids, in particular in water applications, must therefore not be performed.

The use of the method according to the invention also provides time savings compared to the conventional method with bonding agent application. Usually, in case of bonding agent application one must wait until the latter has completely reacted. In contrast, a substance-fused or material-fused connection can be realized much faster by drying in case of the solvent application.

Moreover, by partial dissolving of one or both fiber layers an improved adhesion between the nanofiber layer and the substrate layer can be achieved in comparison to the bonding agent.

Figure 6:
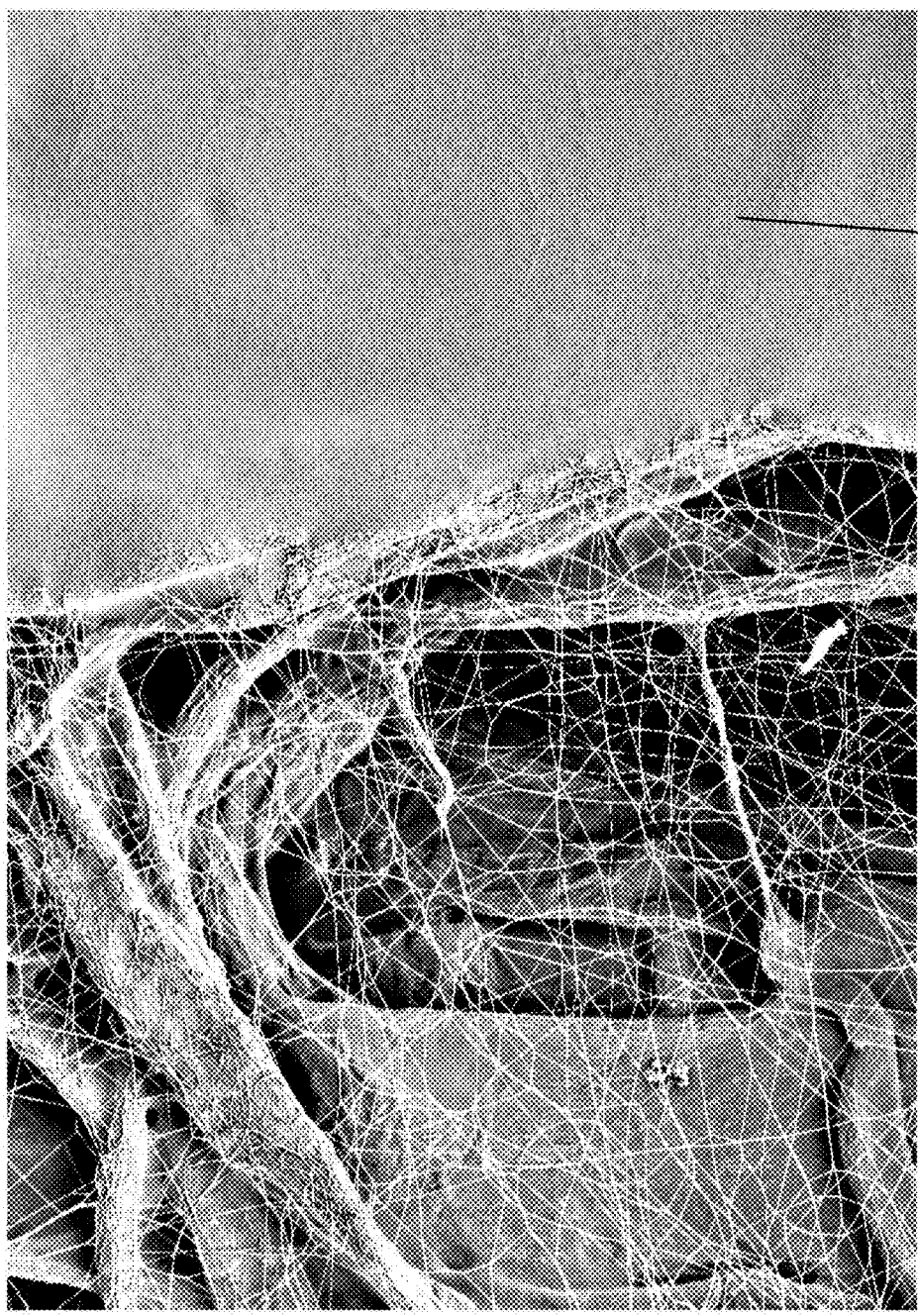
FIG. 6 is monochromatic image of a filter medium not in accordance with the invention.

In gas filtration, when using bonding agents a sail formation occurs, i.e., the bonding agent is plastically deformed and creates air resistance. This is illustrated in FIG. 6. In particular, the sail 5 can be seen which greatly impairs the permeability of the filter medium.

This is also not the case in a filter medium which has been produced by using the production method according to the invention.

FIGS. 2a, 2b; 3a, 3b; 4a, 4b; 5a, 5b are microscopic illustrations of a filter medium produced according to the method of the present invention.

In FIGS. 2a and 2b, one can see a substrate layer of coarse fibers 1 and a layer of nanofibers 2 deposited thereon. One can see that the nanofibers 2 are deposited only like a spider web on the coarse fibers of the substrate layer.

Figure 3A:
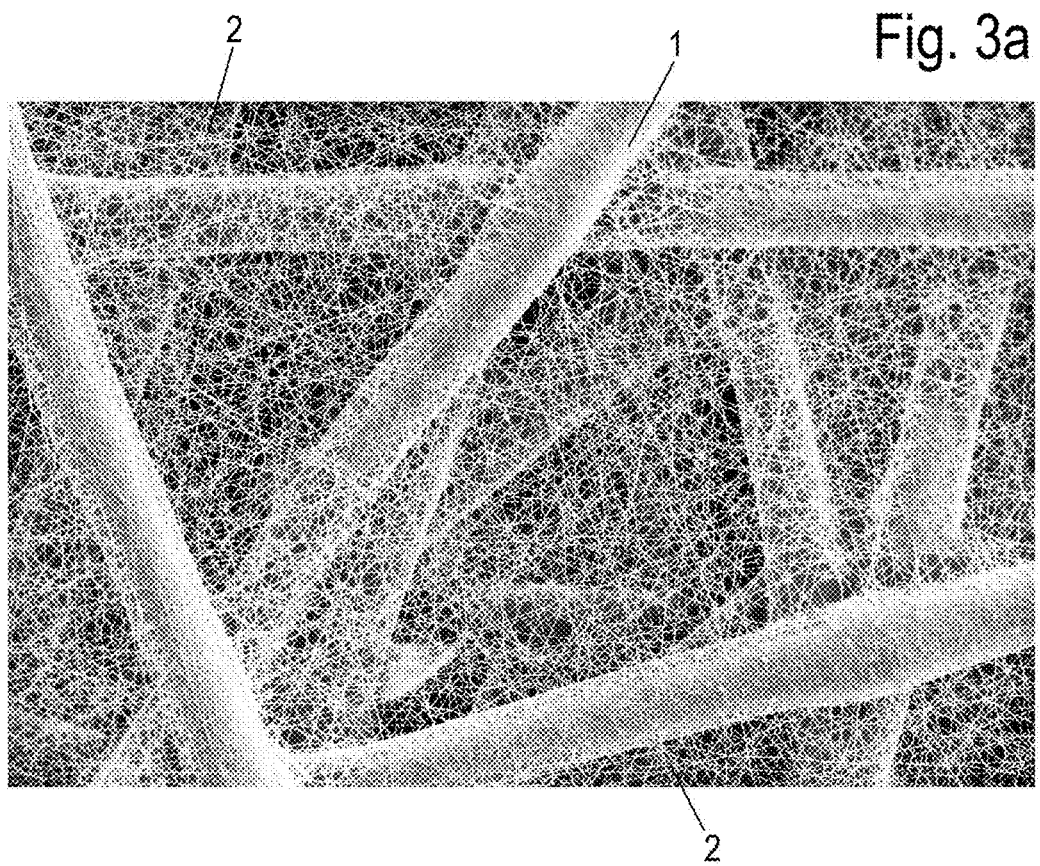
Figure 3B:
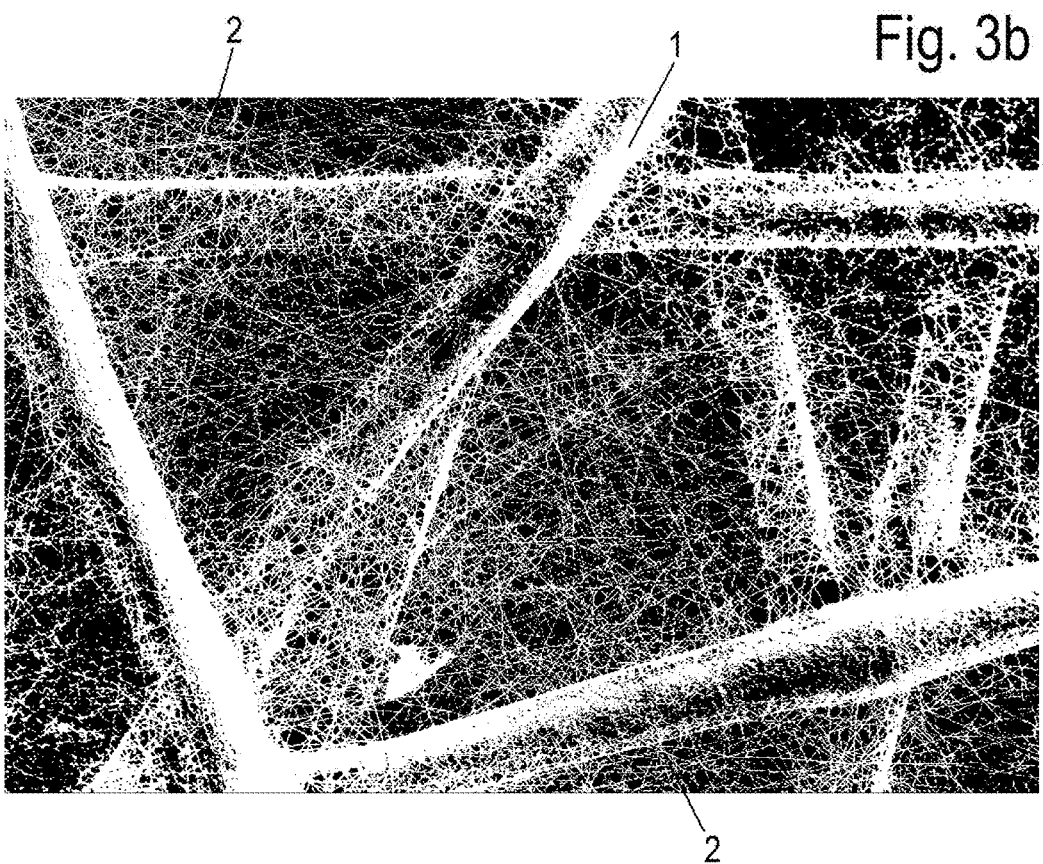

FIGS. 3a and 3b show an enlarged detail of FIGS. 2a and 2b. One can see that the nanofiber layer is primarily locally arranged about the coarser fibers and arranged at the crossing points of these fibers.

Figure 4A:
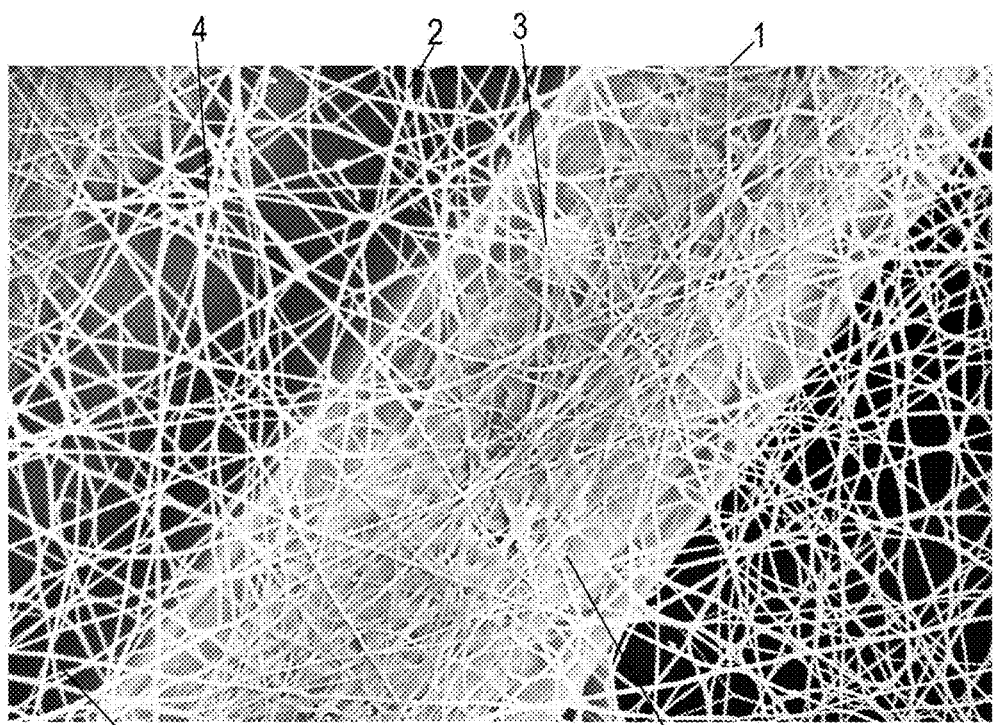
Figure 4B:
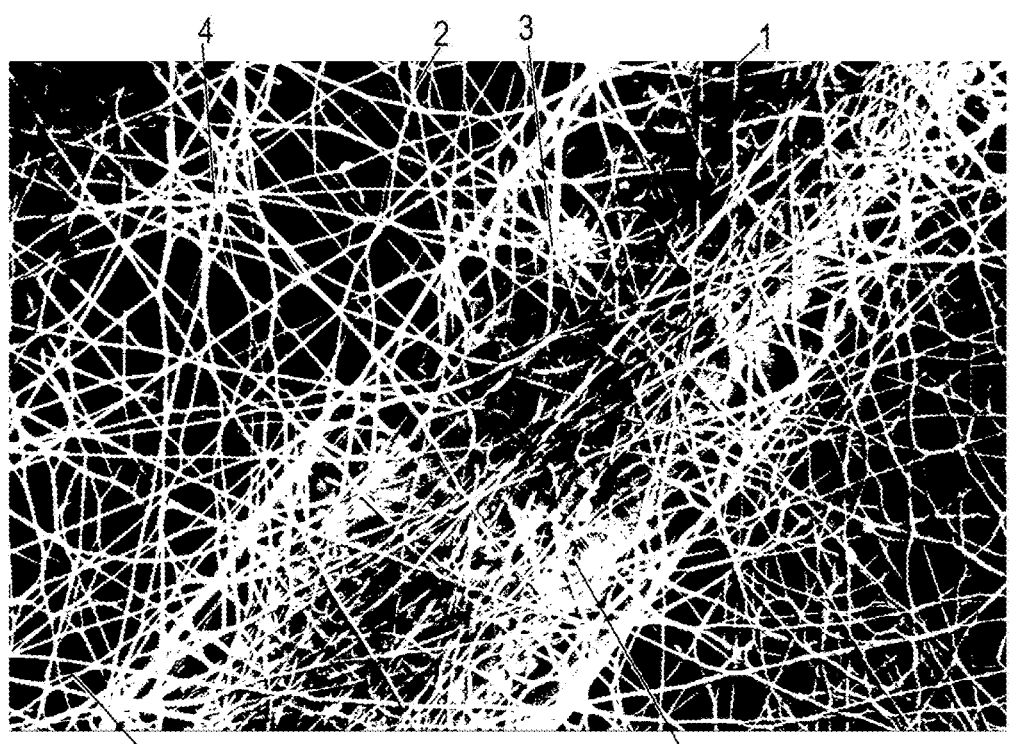

FIGS. 4a and 4b show a reduced detail of FIGS. 3a and 3b. One can see in the white areas of the nanofibers on the section of the coarse fibers that the nanofibers are connected to each other in a fused area 3. In this context, the fiber contour of individual fibers in this fused area is partially completely dissolved. This phenomenon is however not caused by melting of the nanofibers but by partial dissolving of the fiber surface. Solvent droplets had been arranged exactly in this area. Outside of this detail of the coarse fibers, at the crossing points 4 of individual nanofibers, these nanofibers are mostly loosely placed on each other or connected to each other punctiform and significantly less widespread.

Figure 5A:
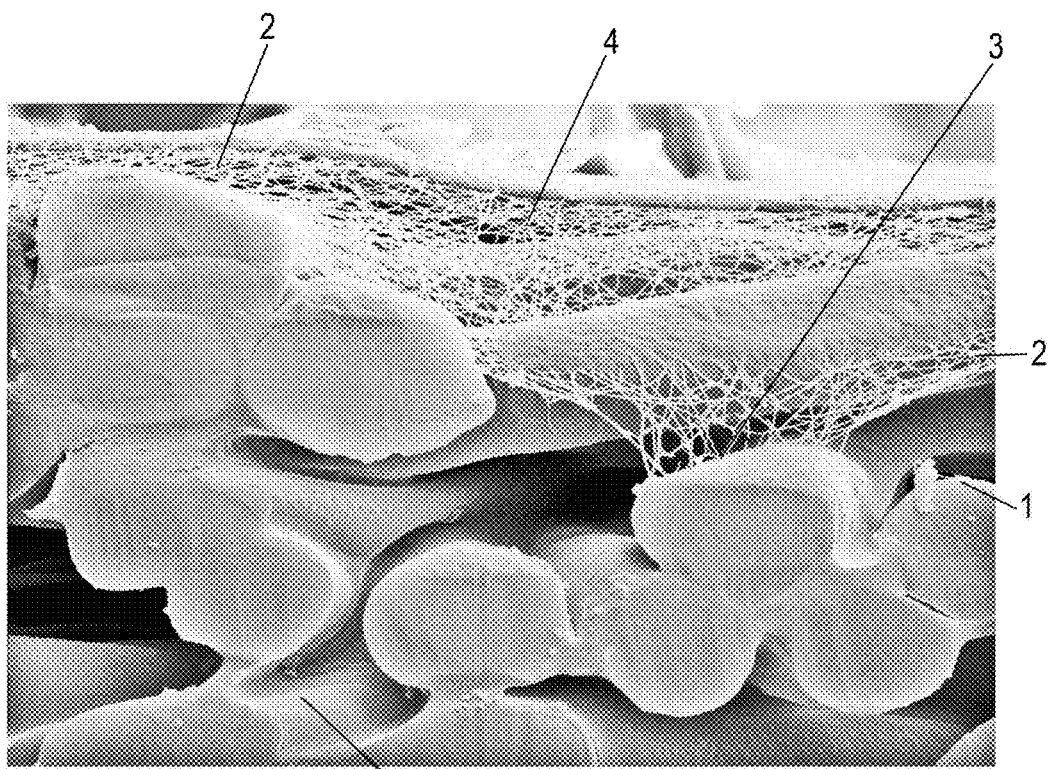
FIG. 5a is a section view of the filter medium according to the invention as a microscope image.
Figure 5B:

FIGS. 5a and 5b show a section view of the coarse fibers 1 of the substrate layer and the nanofibers 2 of the nanofiber layer deposited on top. One can see that the nanofibers 2 are connected to the coarse fibers 1 only from one side. One can see that the nanofibers are material-fused to the coarser fibers.

What is claimed is:

1. A method for producing a filter medium, the method comprising:
providing at least one substrate layer of a nonwoven comprising cellulose fibers and/or synthetic polymer fibers;
depositing a fiber layer of polymer fibers on the at least one substrate layer;
applying, prior to depositing the fiber layer, a solvent to the at least one substrate layer
wherein a material of the at least one substrate layer and/or a material of the fiber layer is soluble in the solvent.

2. The method according to claim 1, wherein
the fiber layer is a nanofiber layer, wherein at least 90% of the polymer fibers of the nanofiber layer are nanofibers.

3. The method according to claim 1, wherein
the fiber layer is a nanofiber layer, wherein at least 90% of the polymer fibers of the nanofiber layer have an average fiber diameter of less than 500 nm.

4. The method according to claim 3, wherein
the average fiber diameter is less than 200 nm.

5. The method according to claim 1, wherein
the solvent is an acid or a base.

6. The method according to claim 5, wherein
the acid is a diluted acid or a concentrated acid.

7. The method according to claim 5, wherein
the base is a diluted base or a concentrated base.

8. The method according to claim 5, wherein
the acid is an organic acid.

9. The method according to claim 5, wherein
the base is an organic base.

10. The method according to claim 1, wherein
the solvent that is applied to the at least one substrate layer comprises a plastic compound.

11. The method according to claim 1, wherein
depositing the fiber layer is done by electrospinning.

12. The method according to claim 1, further comprising, after depositing the fiber layer, drying the at least one substrate layer and the fiber layer.

* * * * *